(No Model.)

E. N. DICKERSON.
ACETYLENE GAS PRODUCER.

No. 563,457. Patented July 7, 1896.

Witnesses
Geo. Wadman
H. Constant

Inventor
E N Dickerson

THE NORRIS PETERS CO., PHOTO-LITHO., WASHINGTON, D. C.

UNITED STATES PATENT OFFICE.

EDWARD N. DICKERSON, OF NEW YORK, N. Y.

ACETYLENE-GAS PRODUCER.

SPECIFICATION forming part of Letters Patent No. 563,457, dated July 7, 1896.

Application filed January 3, 1896. Serial No. 574,205. (No model.)

*To all whom it may concern:*

Be it known that I, EDWARD N. DICKERSON, of No. 253 Broadway, in the city, county, and State of New York, have invented a new and useful Improvement in Gas-Producing Apparatus, of which the following is a full, true, and exact description, reference being had to the accompanying drawings.

This invention relates to an improvement in apparatus designed for the purpose of forming gas by the combination of a liquid and a solid, and is especially applicable to the formation of acetylene gas by combining calcium carbid with water. It is especially applicable to the filling of holders or receptacles at intervals, and its especial advantage is that no valve-opening is required to introduce the calcium carbid into the generator, the generator being so arranged as that it is sealed by the water-pressure in process of generation, while when it is to be charged it is open to the atmosphere.

My invention will be readily understood from the accompanying drawings, in which—

Figure 1:
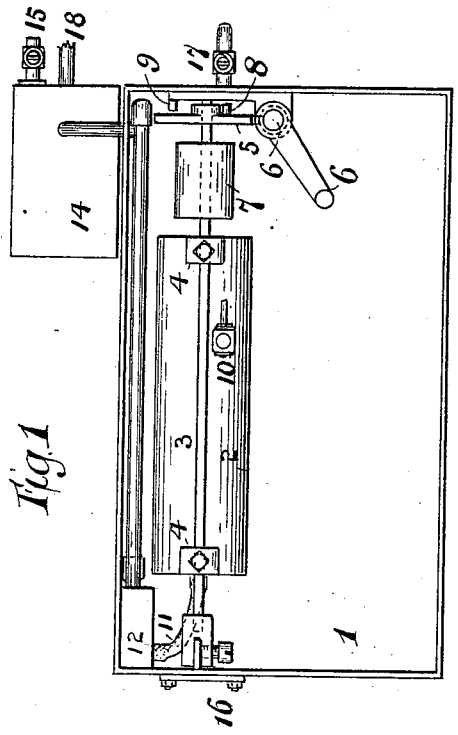
Figure 2:
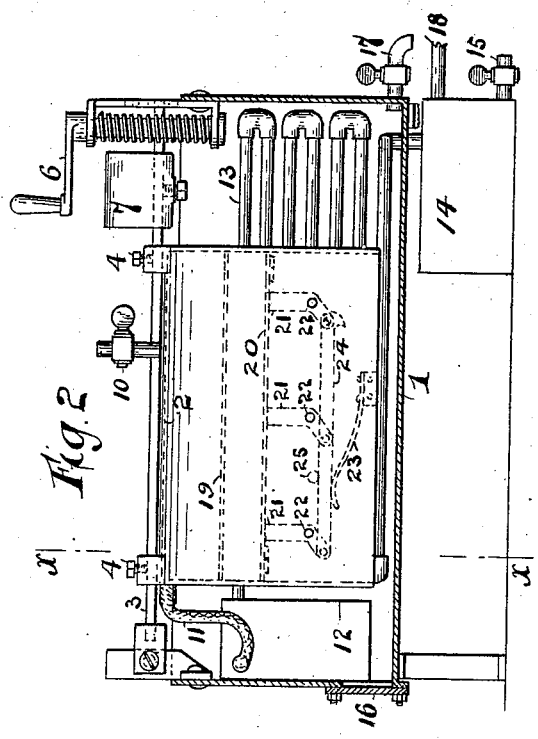
Figure 3:
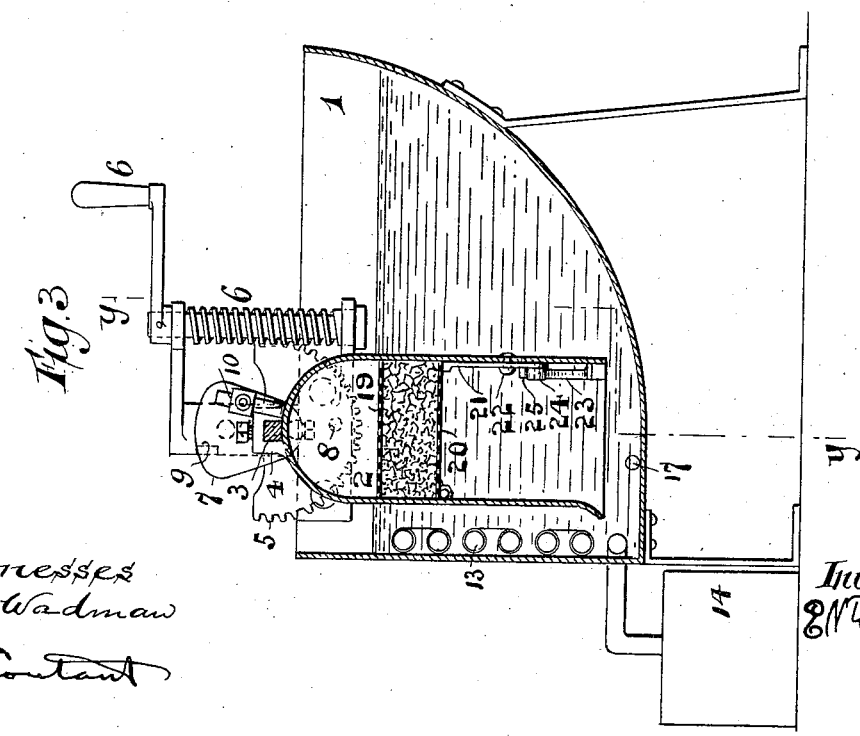

Figure 1 represents a plan view; Fig. 2, a section through Fig. 3 on the line $y\ y$, and Fig. 3 a cross-section through Fig. 2 on the line $x\ x$.

The apparatus consists generally of a movable receptacle 2 for receiving the calcium carbid, located in a suitable tank 1. The said receptacle is pivoted on the shaft 3, by means of which it can be elevated above the water or depressed into the position shown in the drawings. It is provided with a grating 19 and a pivoted grating 20. The receptacle 2 may be of any suitable shape, but, as shown, is U-shaped in cross-section. The shaft 3 is preferably made square, though it may be of any suitable construction, and the receptacle 2 is carried upon it by lugs 4, provided with suitable set-screws. When the apparatus is of considerable size, the counterbalance 7 may be employed and the receptacle may be elevated by means of a worm 6 and gear 5, meshing therewith. The gear is provided with stop 8, which engages in its elevated position with stop 9 on the frame supporting the worm. Of course in small apparatuses a worm-gear is not required, but a suitable stop should be conveniently arranged to hold the vessel in its upper position, the said stop not being necessary where a worm is employed. The pivoted grating 20 is locked in its closed position in any suitable way, as shown, by bell-crank bolts 21, pivoted at 22. When these bolts are thrown out of the way, as, for instance, by the connecting-bar 24, the grating 20 can be raised parallel to the side of the vessel in which it is pivoted. This is, of course, done when the vessel is raised, so that the U stands upright. When, however, the bar 24 is swung to the left, as shown in Fig. 2, it is arrested by the fixed stop 25, and is held in position by the spring 23. The receptacle or generating vessel 2 is provided with a drain-cock 10, by which it can be emptied when raised, and which cock also serves when the vessel is lowered to allow the escape of any air when the gas is generating and before it passes to the service-pipes.

A flexible gas connection 11 connects with the upper part of the generator 2, as shown in Fig. 2, and also connects with the box 12, from which at another part the gas passes through the condensing-coil 13, which connects with the water-receptacle 14, from which the gas passes again to the holder or other service by pipe 19.

In the generation of acetylene gas considerable water is carried off with the gas. This will then pass into the box 12, closed at the top and open at the bottom, and sealed, of course, by the water in the vessel 1. Any remaining vapor will be condensed in the condenser 13 and received in the vessel 14, from which it can be drawn out at times through the drip-cock 15.

The lime which falls to the bottom of the vessel 1 can be removed through the hand-hole 16 or otherwise, and the vessel itself can be emptied when desired through the drain-cock 17.

The operation of my device will now be readily understood. The generator 2 is raised to the upper position either by the worm-gear or by a suitable handle. The grating being raised, the chamber between the grating 19 and 20 is filled with carbid, any water in the vessel lying at that time in the lower bend of the U. The generating-chamber is then lowered to the position shown in Fig. 3, and the water-level being properly adjusted the generation of gas immediately commences. If desired, the air may first be purged through the purge-cock 10. Then the gas passes, as before indicated, to the holder. This action will continue until the carbid is exhausted if the difference in the water-level between the outside and the inside of the generating-chamber exceeds the pressure of the holder. The water-level will be lowered within the generating-vessel as the pressure in the holder increases and the generation will be, to that extent, automatically controlled.

I hereby disclaim the combination of the condenser with the apparatus herein shown, having filed a separate application therefor on the 25th day of May, 1896, Serial No. 592,980.

What I claim as my invention, and desire to secure by Letters Patent, is—

1. In a gas-producing apparatus the combination with a tank for containing water, of a pivoted receptacle mounted to move in said tank, the said receptacle being closed at its top and provided with a connection for the escape of gas and having an opening for the entry of water, mechanism for supporting a solid material in said pivoted receptacle and mechanism for turning the receptacle so that in its upper position it is turned with its water-opening upward and in its lower position with its water-opening downward, substantially as described.

2. In a gas-producing apparatus, the combination with a tank, of a pivoted receptacle mounted to move in the tank, the receptacle being provided with a grating 20, and with a gas-outlet 11, connected with that part of said pivoted receptacle which is upward when the said receptacle is in its operative position and mechanism for moving the receptacle into its inoperative position in the tank, substantially as described.

3. The combination with the water-tank 1, of a receptacle 2, containing a fixed grating 19, and a movable grating 20, and mechanism for turning the same, substantially as described.

In testimony whereof I have signed my name to this specification in the presence of two subscribing witnesses.

E. N. DICKERSON.

Witnesses:
H. COUTANT,
ERNEST M. WELCH.